US011193558B2

(12) United States Patent
Miller

(10) Patent No.: US 11,193,558 B2
(45) Date of Patent: Dec. 7, 2021

(54) TRANSMISSION WITH DUAL BI-DIRECTIONAL INPUT AND SINGLE BI-DIRECTIONAL OUTPUT

(71) Applicant: Loc Performance, Inc., Plymouth, MI (US)

(72) Inventor: Scott C Miller, Troy, MI (US)

(73) Assignee: Loc Performance Products, LLC, Plymouth, MI (US)

(*) Notice: Subject to any disclaimer, the term of this patent is extended or adjusted under 35 U.S.C. 154(b) by 344 days.

(21) Appl. No.: 16/401,989

(22) Filed: May 2, 2019

(65) Prior Publication Data
US 2020/0347915 A1    Nov. 5, 2020

(51) Int. Cl.
*F16H 3/089*    (2006.01)
*F16H 3/091*    (2006.01)
*B60K 6/365*    (2007.10)

(52) U.S. Cl.
CPC ............. *F16H 3/089* (2013.01); *B60K 6/365* (2013.01); *F16H 3/091* (2013.01)

(58) Field of Classification Search
CPC .......... F16H 3/089; F16H 3/091; F16H 3/725; F16H 3/44; F16H 3/72; B60K 6/365; F41A 27/24
See application file for complete search history.

(56) References Cited

U.S. PATENT DOCUMENTS 2,437,646 A    3/1948  Matulaitis
3,625,328 A   12/1971  Carli (Continued)

FOREIGN PATENT DOCUMENTS

DE    10 2005 051 984       7/2006
DE    10 2012 109 637       4/2020
WO    WO-2020193976 A1 * 10/2020    ............. B60K 6/387

OTHER PUBLICATIONS

Related Case German Case (DE App. No. 10 2019 208 838.4) Office Action [and translation].

*Primary Examiner* — Victor L MacArthur
(74) *Attorney, Agent, or Firm* — Panagos Kennedy PLLC; Bill Panagos; Linda Kennedy

(57) ABSTRACT

A dual bidirectional input to single bidirectional output transmission (or gear box) comprising of unique gear ratios between each of the bidirectional inputs and the single, or common, bidirectional output is disclosed. The gear box has a gear train design with two bidirectional inputs and one (or common) bidirectional output. The device is configured to enable torque to be transmitted through either one or both of the bidirectional inputs to the bidirectional output. The gear train may be a constant mesh system which eliminates sliding splines, dog clutches or synchronizers to switch between operational modes. A locking feature/component/ element allows the power or torque to be transmitted from a first bidirectional input to the common bidirectional output using a second bidirectional input as a fixed rotation reference. Similarly power or torque from the second bidirectional input to the common bidirectional output may use the first bidirectional input as a fixed rotation reference. The disclosure may also include a planetary gear set load combiner to cause both bidirectional inputs to transmit torque or power to the common output simultaneously. Additionally, the locking feature/component/element enables the transfer of torque from either inputs independently without back driving the other input.

13 Claims, 6 Drawing Sheets

(56) References Cited

U.S. PATENT DOCUMENTS

| | | | |
|---|---|---|---|
| 4,364,286 A | 12/1982 | Ciolli | |
| 6,371,882 B1* | 4/2002 | Casey | F16H 3/728 475/2 |
| 8,413,547 B2 | 4/2013 | Yang | |
| 8,951,160 B2 | 2/2015 | Vernon et al. | |
| 2006/0112781 A1* | 6/2006 | Kuras | B60W 30/188 74/661 |
| 2010/0024582 A1 | 2/2010 | Fitzgerald | |
| 2012/0006153 A1* | 1/2012 | Imamura | B60K 6/54 74/665 A |
| 2015/0180304 A1 | 6/2015 | Miller | |
| 2016/0069429 A1 | 3/2016 | Fitzgerald | |

* cited by examiner

State Transition Diagram

| ID | TRANSITION DESCRIPTION |
|---|---|
| 1 | ENABLE DEPRESSED |
| 2 | ENABLE RELEASED |
| 3 | JOYSTICK UP |
| 4 | JOYSTICK RELEASE |
| 5 | JOYSTICK DOWN |
| 6 | IF BATTERY >22.2VDC WITH 1 V HYSTERESIS |

TRANSMISSION WITH DUAL BI-DIRECTIONAL INPUT AND SINGLE BI-DIRECTIONAL OUTPUT

GOVERNMENT INTEREST STATEMENT

This invention was made, at least in part, with U.S. Government support under contract number W15QKN-17-C-0120. The United States Government has certain rights in this invention.

TECHNICAL FIELD

Transmissions for transmitting torque or power from a prime mover or input to a drive train or output are well known. Transmissions are widespread and varied, and find applications in various mechanical devices such as washing machines and other appliances, vehicles, and military applications. Vehicle applications include transmitting torque or power from the engine or motor to the drive wheels. Electrification of vehicles presents additional issues for transmissions that are the subject of great effort. Electric vehicle motors are capable of very high torques very quickly, and suitable transmissions are needed to permit the operator to control the torques transmitted from the motor to the output that allows the operator to go forward and backward.

The military applications may include drive systems to control elevation and azimuth of field artillery and armored vehicle main weapons systems such as main gun. In such military applications, a drive unit may be provided with a manual input and a motorized input for transmitting power to a single output. Such a drive or transmission may present operation issues wherein the manual operation may not satisfactorily or quickly disengages from the output such that when a motorized input is used, the manual input is also actuated. If the manual input is not quickly disengaged, safety of the operator may be compromised.

There is a need for a dual bidirectional input single bidirectional output transmission to transmit power or torque from at least one input to the single (common) bidirectional output. Such a transmission may have a different gear ratio between each input and a common output. Such a transmission should also prevent "backdriving" the non-engaged input when one input is operational. The transmission should switch quickly and seamlessly between the individual inputs and possess an ease of use and a high degree of reliability.

SUMMARY

In one embodiment, there is disclosed a dual bidirectional input to single or common bidirectional output transmission (or gearbox) having different gear ratios between each of the bidirectional inputs and the single, or common, bidirectional output. Generally, and without limitation, the transmission (gearbox) has a gear train design with two bidirectional torque inputs and one (or common) bidirectional torque output. The device (the transmission or gearbox) is configured to enable switching between transmitting torques independently through either individual inputs or transmitting the combined input torques simultaneously to the common torque output. In one embodiment, the gear train may be a constant mesh system which eliminates sliding splines, dog clutches or synchronizers (as is known in automotive transmissions) to switch between operational modes. By use of a clutch or brake, the power or torque transmitted from a first bidirectional torque input to the common bidirectional output using a second bidirectional input as a fixed rotation reference. Similarly, power or torque from the second bidirectional torque input to the common bidirectional torque output may use the first bidirectional torque input as a fixed rotation reference. In addition, the embodiments of the disclosure may also include a planetary gear set load combiner to cause both bidirectional torque inputs to transmit torque or power to the common torque output simultaneously. The disclosure presents a number of benefits that are an improvement over the existing gearboxes or transmissions. Specifically, the gearbox or transmissions of the disclosure have a constant gear mesh (i.e., no sliding splines or synchronizers) for high reliability. The disclosure may prioritize one of the bidirectional torque inputs by overriding the second bidirectional torque input. In addition, the embodiments may have different gear ratios between the individual bidirectional torque inputs and the common torque output.

DETAILED DESCRIPTION

Figure 1:
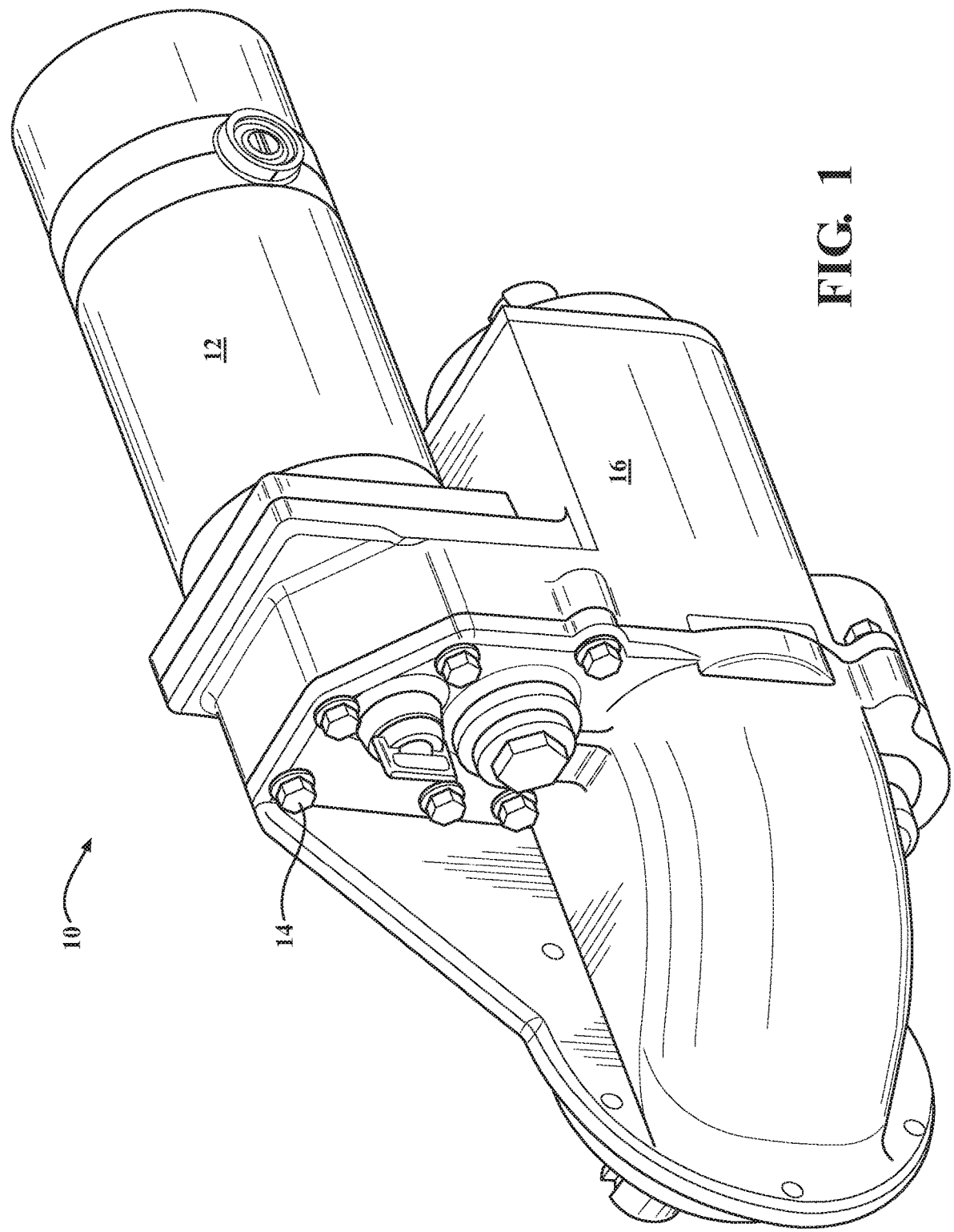
FIG. 1 is a perspective side view of an elevation drive unit including a gearbox according to one embodiment of the disclosure.

Referring now to the drawings wherein like numbers refer to like structures, FIG. 1 is perspective side view of one embodiment of the disclosure as an elevation drive unit 10 for military application. The elevation drive unit has a housing 12, to which is fastened, by fasteners 14, to an input housing 16 enclosing a first bidirectional torque input. The elevation drive unit transmits torque to an elevation screw drive box (not shown) and permits shifting between a motor and handle-wheel input on an artillery piece or main gun of an armored vehicle (not shown). The motor, as will hereinafter be described, is integrated to a custom gearbox that provides dual three (3) stage gear reduction, seamless dual input switching and an emergency or maintenance motor lockout. The elevation drive unit may be used to control elevation and positioning of field artillery or tank main gun. Those skilled in the art understand that the dual bidirectional input single (common) bidirectional output gearbox or transmission as described herein may also be adapted to transmissions for motor vehicles, such as transmissions for electric vehicles, or other applications.

Figure 2:
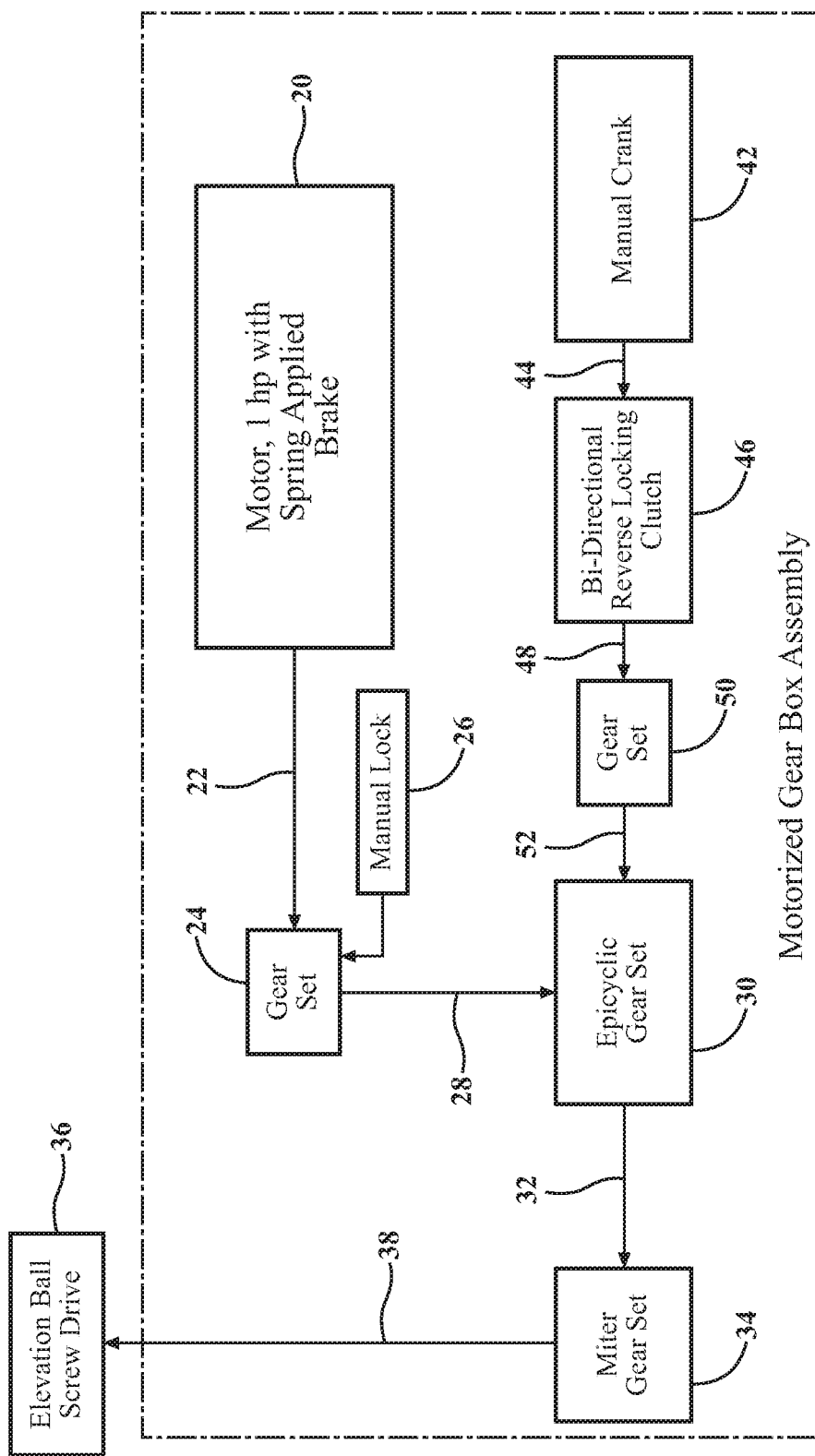
FIG. 2 is a functional block diagram of the general dual drive gearbox of the elevation drive unit of FIG. 1.

Turning to FIG. 2, there is shown a flowchart of the motorized gearbox assembly 18 in one embodiment of the disclosure. First bidirectional torque input 20, shown as a motor, usually electric, having one hp and electrically connected to a spring applied brake. The first directional torque input 20 transmits torque as at 22 to a first gear set 24. The assembly is provided with a manual lockout 26, for service or operational convenience. The first gear set transmits torque as at 28 to an epicyclic gear set 30, which in turn transmits torque as at 32 to a miter gear set 34. The miter gear set transmits torque as at 38 to an elevation ball screw drive 36 to control the elevation of a field gun or tank gun.

Second bidirectional torque input 42 (shown as a manual crank) transmits torque as at 44 to bidirectional reverse locking clutch 46. The reverse bidirectional locking clutch 46 may act as a brake when the first bidirectional torque input is operating to prevent second bidirectional torque input back drive. The bidirectional reverse locking clutch transmits torque as at 48 to a gear set 50. The gear set 50 transmits torque as at 52 to the epicyclic gear set. The transmission of torques from the epicyclic gear set is as previously described.

In one embodiment, the gear ratio of the first bidirectional torque unit through the gear set and epicyclic gear set is much greater than the gear ratio of the second bidirectional torque input through its corresponding gear set 50 to the epicyclic gear set. This may be the case when the second bidirectional torque input is manually actuated and the first bidirectional torque input is an electric motor or the like.

Figure 3:
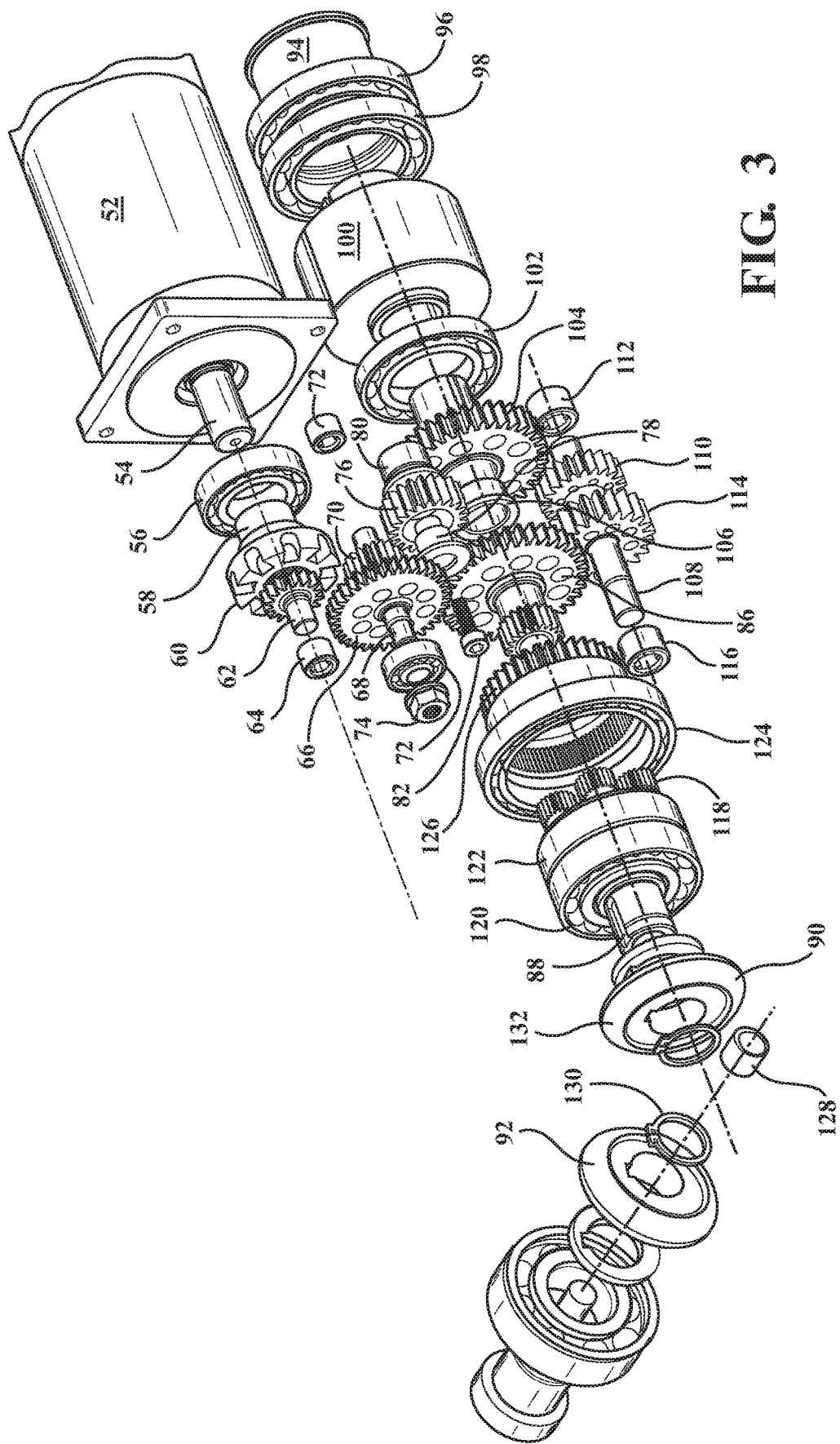
FIG. 3 is an exploded view of the dual drive gear box showing its components.

Turning to FIG. 3, is an exploded view of the dual bidirectional input and single bidirectional output mechanism according to one embodiment of the disclosure. First bidirectional torque input, shown as a reversible electric motor 52 has a shaft 54. The motor may rotate the shaft clockwise or counterclockwise. The shaft fits through a ball bearing ring 56, which accommodates a flange 58 on spur gear 60. The spur gear 60 has a shaft 62 onto which a needle bearing 64 is mounted. Having described the first bidirectional input, the first bidirectional input interrupt will be described. A second spur gear 66, which may have more teeth that spun gear 60, is affixed to a shaft 68. A spur gear 70, which may have the same number of teeth as spur gear 60 is affixed to shaft 68 on one side of the spur gear 66. A needle bearing 72 is located on the shaft, adjacent to spur gear 70. On an opposite side of the spur gear 66 the shaft accommodates a ball bearing 72 and a needle bearing 74. The first bidirectional input idler will now be described. Spur gear 76 is carried on needle bearing 80. The needle bearing assembly is supported by spindle 78 and is held in place by fastener 82. When the first bidirectional input shaft is rotated, spur gear 60 rotatably engages spur gear 66 which in turn causes spur gear 70 to engage first sun gear 86 to rotate the single bidirectional output shaft 88. The output shaft is equipped with bevel gear 90, which may or may not be engaged with bevel gear 92.

Turning to the second bidirectional input, shaft 94 is equipped with ring ball bearings 96, 98. The input shaft interacts with bi-directional reverse locking clutch 100, which engages or disengages to permit rotation of the output shaft as will be described. The output of the clutch transmits torque to the spur gear assembly 104 which is radially supported by ring ball bearing 102. The spur gear 104 has a needle bearing 106 to provide support for the sun gear 86. Spur gear 86 drives a gear assembly consisting of a shaft 108 equipped with a spur gear 110 and a needle bearing 112 at one end, and a spur gear 114. The shaft also carries a needle bearing 116. Spur gear 114 drives ring gear 126 and through the epicyclic gear set to the output shaft 88.

The epicyclic gear box will now be described. A plurality of planet gear sets 118 carried on shaft assembly 88, supported by ball bearings 120, 122, are engaged with sun gear 86 of first bidirectional input and ring gear assembly 126 that engages with the second bidirectional input. In this embodiment, ring gear 126 has internal and external for engaging with planet gears 118 and second bidirectional input spur gear 114. Ring gear 126 is supported by ring ball bearing 124. The epicyclic set drives the output shaft and the bevel gear 90. A lock ring 130 holds all the described components onto the right angle output shaft that is supported by the housing through bushing 128. The bidirectional output shaft is equipped with a bevel gear 92 that is configured to be cooperatively engagable with the bevel gear 90.

Figure 4:
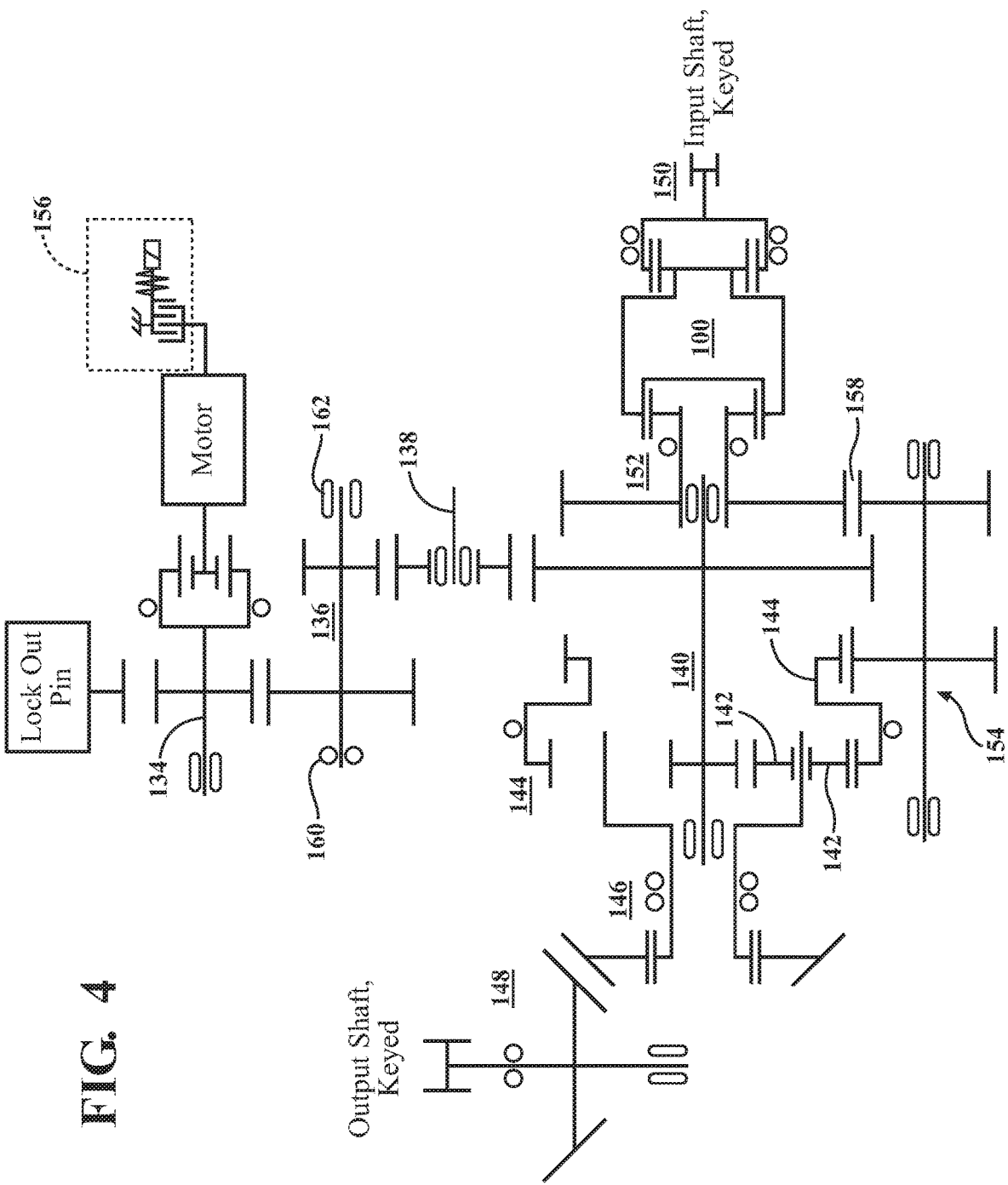
FIG. 4 is a schematic representation of the motorized gearbox architecture.

Turning now to FIG. 4, there is shown a schematic architecture of one embodiment of the dual bidirectional input single bidirectional output gearbox or transmission. Specifically, the first bidirectional torque input, shown as motor input gear 134, interacts with the motor intermediate gear assembly 136 to drive the output shaft. Sun gear assembly 140 interacts with the planet gear assembly 142 as previously discussed to transmit output from the first bidirectional input, shown as a motor. The planet gear assembly engages the ring gear assembly 144 to drive the carrier bevel gear assembly 146 which, in turn, engages the bevel gear output shaft 148. The second bidirectional input, shown as manual input member shaft 150, is rotated and engages the manual input gear 152. The manual input gear engages the manual intermediate gear at gear interface 158 with manual intermediate gear 154 engaging ring gear 144 to drive the epicyclic gear set. As previously discussed the embodiment utilizes various ball bearings 160 and needle bearings 162 throughout, as indicated by the respective symbolic representations thereof as designated by the reference numbers.

During manual operation, rotation is input to the second bidirectional input 150. Through the bidirectional reverse locking clutch 100 and gear interfaces 152 to 158 and 154 to 144. With either the lock out pin engaged or spring applied electrically released brake 156 deenergized (locked) the sun gear 140 of the epicyclic gear set is locked. This provides reference to drive the output 146 with respect to the ring gear 114. During motorized operation (First bidirectional input) the lock out pin must be disengaged and the spring applied electrically released brake energized (free to rotate). The motor transmits rotation through gears 134, 136, and 138 to drive the sun gear assembly 140. Due to the designed function of the bidirectional reverse locking clutch 100, the ring gear 144 is effectively locked since it cannot rotate the second bidirectional input 150 through the clutch 100. This effect provides the fixed rotational reference for sun gear 140 to drive the bidirectional input 146. In this embodiment, provided the lock out pin is disengaged, both the first and second bidirectional inputs can be driven to the single bidirectional output provided that their torques are balanced. Their common output will be the summation of their rotation speeds according to the governing equations for epicyclic gear trains. To enable this feature, the torque must be at equilibrium at the common interface point.

Figure 5:
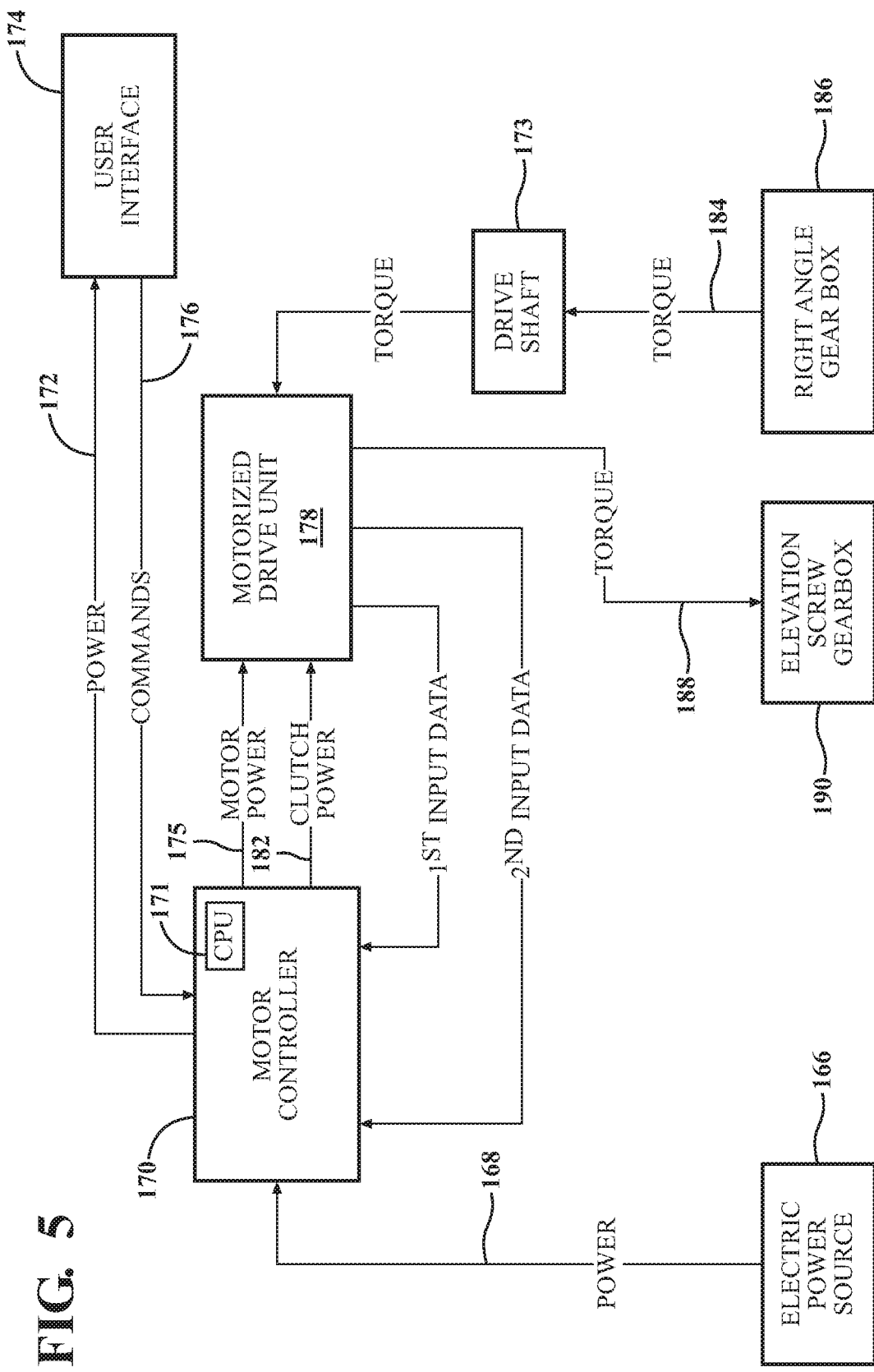
FIG. 5 is a functional context diagram of the elevation drive unit.

Turning now to FIG. 5, there is seen a schematic of the functional context diagram for one embodiment of the dual bidirectional input single bidirectional output gear box (transmission) of the disclosure. Specifically, an electrical power source 166, such as a battery pack or other power source is electrically connected at 168 to the motor controller 170. The motor controller is electrically connected at 172 to the user interface 174. In one embodiment, the user interface is a rheostat switch or other variable switch that send power to the motor controller to control motor speed and direction of rotation. When the user interface is in a first position, the motor rotate in a first direction at a variable speed, and when the user interface is in a second position, the motor rotates in an opposite direction at a variable speed. In still another embodiment, at least one of the motor controller and the user interface 174 includes a central processing unit (CPU) 171 and memory for storage of instructions and other data. The CPU accesses the memory for commands stored therein. The commands may related to motor RPM, direction to rotation of output shaft, or other instructions relating to torque. Other instructions may include the status or operation of the bidirectional reverse locking clutch and the brake to control whether first, second or both of the bidirectional inputs may be permitted to apply torque to the single bidirectional output. The memory may by RAM, ROM, DRAM, PROM, EEPROM, FLASH or any other memory. The commands in memory may be stored in tables or curves in the memory.

The user interface permits an operator (or a computer device) to send commands at 176, to the motor controller to perform any of the commands stored in motor memory. The motor controller may send commands 175 to activate the motorized drive unit 178 and may regulate the direction of rotation and amount of torque to be generated by the motorized drive unit. This may be accomplished by controlling the revolutions per minute (RPMs) generated by the motor, and/or by controlling the direction of rotation of the motor output shaft. The motor controller further sends data signals 182 to the motor drive unit regarding the status and operation of the spring applied electrically release brake or clutch. The brake or clutch may controlled to respond to RPMs or torque to control whether the first, second or both the bidirectional inputs may be applied to the single bidirectional output, shown as the drive shaft 173. This may be accomplished by monitoring the RPM or torque 184 generated from the second bidirectional input 186. The motorized drive unit CPU may control the RPM or torque generated by the first bidirectional input to match the RPM from the second bidirectional input. In this status, torque 188 from the first and second bidirectional inputs is transmitted to the single bidirectional output 190. The state and operational performance of each of the first and second bidirectional input may be transmitted back to the motor controller 170 for processing and decision making. As previously discussed, depending upon the status of the lock out pin and the spring applied brake, it is also possible to operate the transmission (gear box) so that torque is transmitted to the single bidirectional output with either the first or second bidirectional input.

Figure 6:
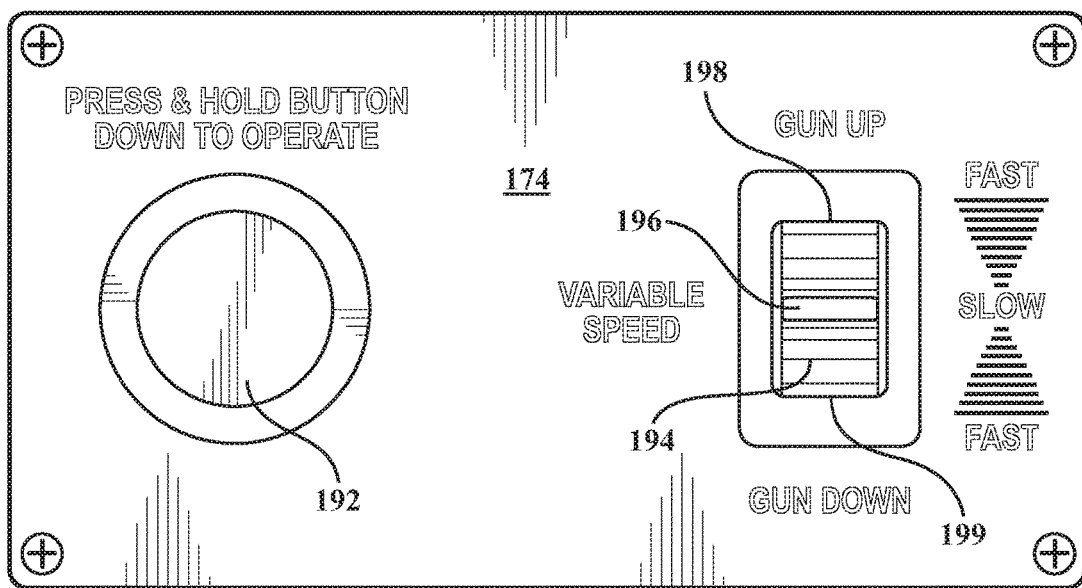
FIG. 6 is a top plan view of the manual input for the elevation drive unit.

FIG. 6 is a top plan view of a user interface 174 according to one embodiment of the disclosure. As may be apparent, FIG. 6 is oriented toward a military application, and will be described as such without limitation to the applicability or modifications possible to adapt the user interface to any purpose consistent with the broadest scope of the disclosure.

User interface 174 has an enable button or switch 192 that permits an operator to select whether to enable the user interface to control the dual bidirectional input single bidirectional output gearbox (transmission) according to one embodiment of the disclosure. In this embodiment of the disclosure, if switch 192 is not closed (enabled), the user interface does not send commands to the motorized controller. In this state, the motorized drive unit is not activated and no torque may be generated from the motor drive unit (first bidirectional input). In this embodiment, switch 192 must be affirmatively activated and held in such state by the operator to enable the user interface. When the user interface is enabled, it is possible to operate the first bidirectional input (motorized drive unit) by sending commands from the user interface to the motor controller as previously described. The user interface may be equipped with a variable switch or rheostat 194 to control the RPMs generated by the motorized drive unit 178 and the direction rotation of the motor input shaft 54. In this embodiment, no movement of the motorized drive unit shaft 54 may occur unless the variable switch 194 is moved from its non activated position 196 to a first position 198 to progressively raise the elevation of an artillery piece or armored vehicle main gun. As the switch 194 is progressively moved from its inactive state to its first position 196, the speed of gun elevation change increases. This is due to the increase RPMs and torque generated by the motorized drive unit. Once the motorized drive unit RPMs exceed the RPM generated by a manual input, the manual torque input (second bidirectional input) is deactivated by means of the clutch as discussed above, and the torque to the single bidirectional output is generated solely by the motorized drive unit (first bidirectional input). As indicated in FIG. 6, movement of the variable switch 194 to a second position 199 causes the gun elevation to progressively decrease. This may be accomplished by reversing the rotation of the motorized drive unit. Again, as the switch 194 is moved progressively to the second position, the speed of the change in elevation of the gun increases.

It is apparent that the user interface could as easily be configured as the controls for a vehicle, especially an electric vehicle, and the dual bidirectional input single bidirectional output gear box is configured as the transmission for the vehicle. The switch 194 could be the start switch for the vehicle, and the variable switch 196 could be a transmission control that permits an operator to control both the speed and direction of the vehicle movement.

Figure 7:
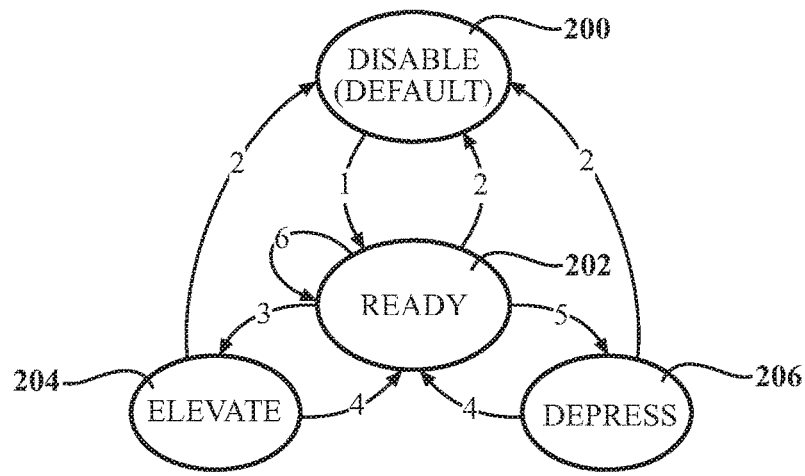
FIG. 7 is a state transition diagram for the elevation drive unit.

FIG. 7 is a state transition diagram describing the behavior of one embodiment of the disclosure. Specifically, the default state 200 of the dual bidirectional input single bidirectional output gearbox (transmission) is disabled. When enabled, as by activating switch 192, the transition state 1 indicates the gear box is ready to operate condition 202. If the switch 192 is not activated, the dual bidirectional input single bidirectional output gearbox is disabled and, as indicated at 2, gun elevation movement is not possible using the gearbox. When the switch 192 is activated, and the variable switch 194 is moved in a first direction, the gun may be elevated 204, as at 3. If the variable switch is moved to its inactive position, the gearbox is in a ready state 202, as at 4. If the variable switch 194 is moved to its second position, the gun elevation may be decreased 206. The gearbox may be activated by the variable switch provided a minimum voltage is detected and available to the motorized unit as at 6.

It is intended that the scope of the present methods and apparatuses be defined by the following claims. However, it must be understood that the disclosed systems and methods may be practiced otherwise than is specifically explained and illustrated without departing from its spirit or scope. It should be understood by those skilled in the art that various alternatives to the configurations described herein may be employed in practicing the claims without departing from the spirit and scope as defined in the following claims. The scope of the disclosed systems and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. A dual bidirectional input, single bidirectional output transmission, comprising:
a first bidirectional torque input, a second bidirectional torque input and a single bidirectional torque output; said first and second bidirectional torque inputs configured to transmit torque to said single bidirectional torque output individually or combined responsive to a torque magnitude at each of the said first and second bidirectional inputs, wherein said first bidirectional torque input transmits torque through a first gear set to an epicyclic gear set and through a miter gear set to the single bidirectional torque output.

2. The dual bidirectional input, single bidirectional output transmission of claim 1, wherein an electronic controller compares the torque magnitude from said first bidirectional torque input to the torque magnitude from said second bidirectional torque input to permit torque transmission to the single bidirectional torque output.

3. The dual bidirectional input, single bidirectional output transmission of claim 1, wherein the torque from the first bidirectional torque input and the second bidirectional torque input are selectively transmitted to said single bidirectional torque output.

4. The dual bidirectional input, single bidirectional output transmission of claim 1, further including a bidirectional reverse locking feature on said second bidirectional torque input; said variable locking feature selectively terminating transmission of torque generated by the second bidirectional torque input to said single bidirectional torque output.

5. The dual bidirectional input, single bidirectional output transmission of claim 1, further including a locking feature inhibiting back drive from one of said first or second bidirectional input while torque is transmitted from said other bidirectional input.

6. The dual bidirectional input, single bidirectional output transmission of claim 1, further including a lock to selectively terminate transmission of torque from said first bidirectional torque output to said single bidirectional torque output.

7. The dual bidirectional input, single bidirectional output transmission of claim 1, further including a variable switch to control torque generated by said first bidirectional torque input.

8. The dual bidirectional input, single bidirectional output transmission of claim 1, wherein said second bidirectional torque output transmits torque through a bidirectional reverse locking clutch to a second gear set to said epicyclic gear set and through said miter gear set to the single bidirectional torque output.

9. The dual bidirectional input, single bidirectional output transmission of claim 1, further including a user interface electrically connected to said first bidirectional torque input; said user interface including an activation switch and a variable torque switch.

10. The dual bidirectional input, single bidirectional output transmission of claim 1, wherein said first bidirectional torque input is a reversible electric motor.

11. A dual bidirectional input, single bidirectional output transmission, comprising:
a single bidirectional output shaft with a first miter gear;
a first bidirectional torque input; said first bidirectional torque input including a shaft equipped with a first gear set; said first gear set including a spur gear on the first bidirectional input shaft; said first gear set including a lock pin;
a first epicyclic gear set that meshes with said first gear set; said first epicyclic gear set including a first sun gear and a first spur gear set that rotates around said first sun gear set;
a second bidirectional torque input; said second bidirectional torque input including a bidirectional reverse locking clutch; said second bidirectional torque input including a second gear set;
a second epicyclic gear set that meshes with a second gear set; said second epicyclic gear set including a second sun gear and a second spur gear that rotates around said said second sun gear set; and
a second miter gear actuated by said first and second epicyclic gear set that meshes with said first miter gear to transfer torque from said first and second bidirectional torque inputs to said single bidirectional torque output shaft.

12. The transmission of claim 11, further including a planetary gear set load combiner to permit both the first and second bidirectional torque inputs to transmit torque to the single torque output.

13. The transmission of claim 11, wherein the gear sets are in constant mesh with each other.

* * * * *